(12) United States Patent
Holmes et al.

(10) Patent No.: US 12,146,773 B2
(45) Date of Patent: Nov. 19, 2024

(54) POSITION ENCODER WITH FUSION OF DIFFERENT SENSOR TYPES

(71) Applicant: Novanta Corporation, Bedford, MA (US)

(72) Inventors: Daniel J. Holmes, Boylston, MA (US); Paul A. Remillard, Littleton, MA (US); Deepak Surendran, Wilmington, MA (US)

(73) Assignee: Novanta Corporation, Bedford, MA (US)

( * ) Notice: Subject to any disclaimer, the term of this patent is extended or adjusted under 35 U.S.C. 154(b) by 245 days.

(21) Appl. No.: 17/748,203

(22) Filed: May 19, 2022

(65) Prior Publication Data

US 2022/0373360 A1 Nov. 24, 2022

Related U.S. Application Data

(60) Provisional application No. 63/190,298, filed on May 19, 2021.

(51) Int. Cl.
*G01D 5/56* (2006.01)
*G01D 5/14* (2006.01)
(Continued)

(52) U.S. Cl.
CPC ............... *G01D 5/56* (2013.01); *G01D 5/145* (2013.01); *G01D 5/2053* (2013.01);
(Continued)

(58) Field of Classification Search
CPC .. G01D 5/145; G01D 5/2053; G01D 5/24476; G01D 5/2451; G01D 5/2497;
(Continued)

(56) References Cited

U.S. PATENT DOCUMENTS 4,988,945 A 1/1991 Nagase
8,546,744 B2 10/2013 Yoshida et al.
(Continued)

FOREIGN PATENT DOCUMENTS

EP 0501453 B1 5/1993
EP 2664897 A1 * 11/2013 ............. G01D 5/145
(Continued)

OTHER PUBLICATIONS

Translation of EP 2664897 (Year: 2012).*
Translation of JP 2009294073 (Year: 2009).*

*Primary Examiner* — Steven L Yeninas
(74) *Attorney, Agent, or Firm* — BainwoodHuang

(57) ABSTRACT

An opto-magnetic rotary position encoder includes a polarization optical encoder and a magnetic encoder, both configured for on-axis placement and operation with respect to a rotational axis of a rotating component. A polarization sensor digital control block and a magnetic sensor digital control block are configured and operative to combine polarizer channel position data and magnetic channel position data in a manner providing for one or more of (1) redundancy, (2) calibration, (3) monitoring performance of one channel in relation to the other channel, or (4) compensation or correction of one channel based on the other channel.

19 Claims, 8 Drawing Sheets

Figure 1:
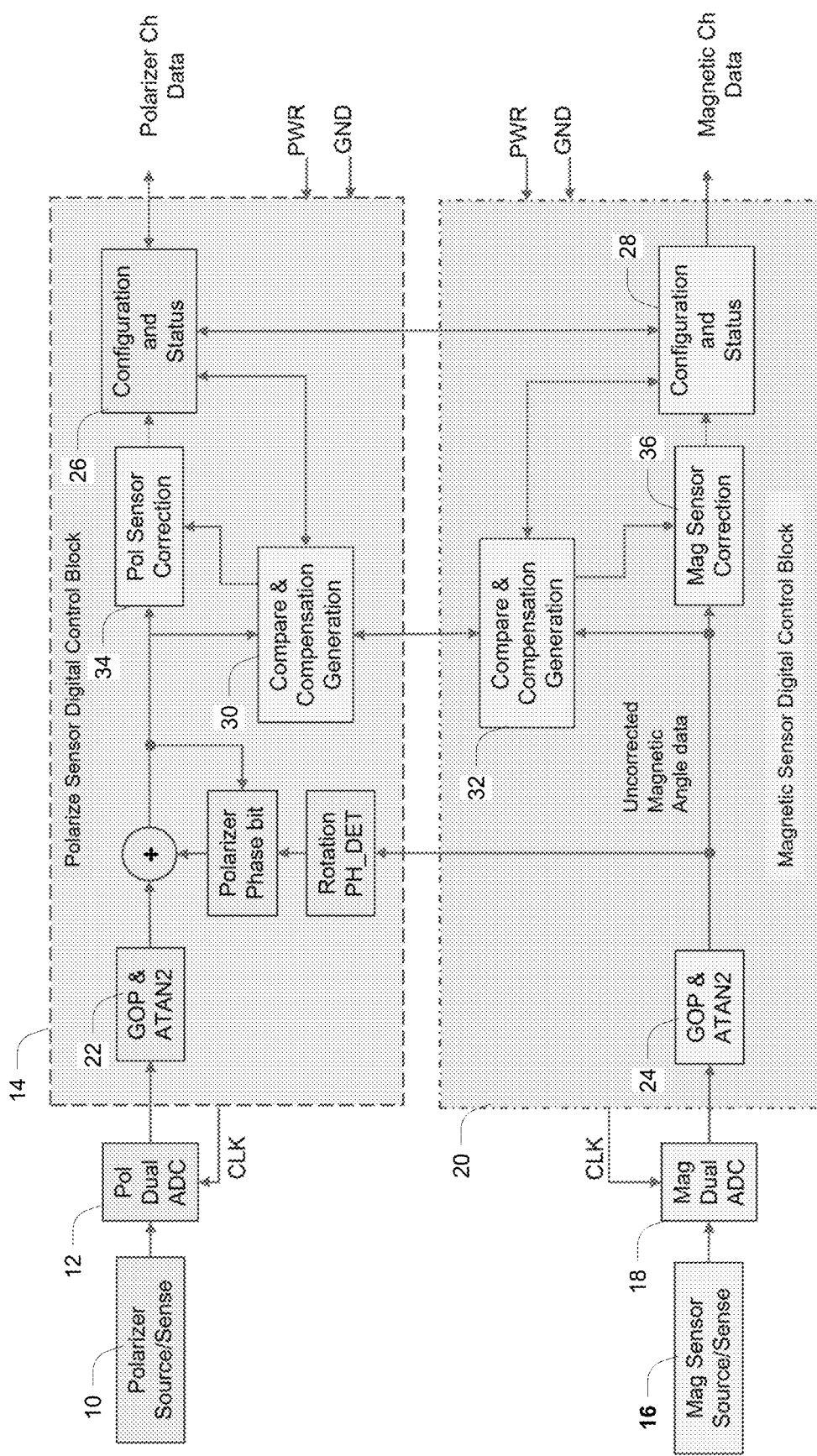

(51) Int. Cl.
  *G01D 5/20* (2006.01)
  *G01D 5/244* (2006.01)
  *G01D 5/34* (2006.01)
  *G01D 5/58* (2006.01)
(52) U.S. Cl.
  CPC ......... *G01D 5/24476* (2013.01); *G01D 5/344* (2013.01); *G01D 5/58* (2013.01)
(58) Field of Classification Search
  CPC ............ G01D 5/26; G01D 5/264; G01D 5/28; G01D 5/30; G01D 5/344; G01D 5/345; G01D 5/3473; G01D 5/34794; G01D 5/56; G01D 5/58
  See application file for complete search history.

(56) References Cited

U.S. PATENT DOCUMENTS

| | | | |
|---|---|---|---|
| 11,573,074 B2 * | 2/2023 | Close | G01D 5/16 |
| 2003/0155489 A1 | 8/2003 | Yasuda et al. | |
| 2005/0131602 A1 | 6/2005 | Souda | |
| 2009/0276180 A1 * | 11/2009 | Schneider | G01D 5/58 |
| | | | 356/614 |
| 2013/0242289 A1 * | 9/2013 | Miyajima | G01D 5/12 |
| | | | 356/72 |
| 2013/0286394 A1 * | 10/2013 | Hopp | G01D 5/341 |
| | | | 356/369 |
| 2017/0167891 A1 | 6/2017 | Maeda et al. | |
| 2019/0234772 A1 * | 8/2019 | Grabowski | G01D 5/145 |
| 2022/0349730 A1 * | 11/2022 | Brajon | G01D 3/08 |

FOREIGN PATENT DOCUMENTS

| | | | |
|---|---|---|---|
| JP | 2009294073 A | * | 12/2009 |
| JP | 5111243 B2 | | 1/2013 |
| WO | 2020229377 A1 | | 11/2020 |

* cited by examiner

POSITION ENCODER WITH FUSION OF DIFFERENT SENSOR TYPES

BACKGROUND

The invention is related to the field of rotary position sensing.

SUMMARY

An opto-magnetic rotary position encoder is disclosed for sensing rotational position of a rotating component. In one arrangement the position encoder includes a polarization-based optical encoder configured for on-axis placement and operation with respect to a rotational axis of the rotating component, and includes (1) a polarizer configured for mounting for rotation with the rotating component, and (2) polarization source/sensing components configured for mounting in proximity to the polarizer to provide a source light beam to the polarizer and to detect a polarized return light beam therefrom. The position encoder further includes a magnetic encoder configured for on-axis placement and operation with respect to the rotational axis of the rotating component, including (1) a magnet configured for mounting for rotation with the rotating component, and (2) magnetic source/sensing components configured for mounting in proximity to the magnet to detect a magnetic field from the magnet, and control circuitry configured and operative to generate polarizer channel position data from the detected polarized return light beam and magnetic channel position data from the detected magnetic field. In one embodiment, the control circuitry includes (1) a polarization sensor digital control block in the polarization-based optical encoder, configured and operative to generate the polarizer channel position data from the detected polarized return light beam, and a magnetic sensor digital control block in the magnetic encoder configured and operative to generate the magnetic channel position data from the detected magnetic field. The polarization sensor digital control block and magnetic sensor digital control block may be configured and operative to combine the polarizer channel position data and the magnetic channel position data in a manner providing for one or more of (1) redundancy, (2) calibration, (3) monitoring performance of one channel in relation to the other channel, or (4) compensation or correction of one channel based on the other channel.

DETAILED DESCRIPTION

Overview

Systems that use position encoder technologies, such as surgical robotics or "wearable robotics" (e.g., bionic prosthetic or exoskeleton), are dependent on motor position control for proper system behavior and performance, and for patient safety, so redundant sensors are desirable. Various sensor technologies are available for motor position measurements, and considerations in selecting an appropriate sensor technology used for position measurements include resolution, accuracy, repeatability, SWaP (size weight and power), ease of installation, and reliability. Typically, to be fully redundant, multiple encoders using separate encoder sources (i.e., independent optical scales, magnetic scales, etc.), and using separate power supplies and communication interfaces, is required. These approaches can be expensive, large, difficult to align, and might share similar dependencies on environmental variables that effect repeatable and reliable operation.

A position encoder arrangement is disclosed that includes two absolute encoder technologies of differing types, for example a polarization-based sensor coupled with a magnetic sensor, that enables an absolute encoder that may be a redundant encoder, a multi-axis encoder, and/or dependently as a multi-sensor fusion encoder, and which can be realized as a small, easy to install sensor that is redundant, self-calibrating, and self-monitoring.

By leveraging two dissimilar rotary encoder technologies, each with separate and dissimilar implementation sensitivities and performance advantages or disadvantages, a small compact encoder can be realized that offers highly versatile absolute position encoder.

In one embodiment of a redundant sensor, the magnetic sensor is mounted under the polarization sensor, and each sensor type is powered independently and with separate communications interfaces. Additionally, because each sensor type has differing environmental sensitivities, a first encoder output can be used to monitor and compensate for anomalies in a second encoder output and visa-versa. The latter capability can also allow real-time monitoring of certain system characteristics.

An opto-magnetic encoder as disclosed herein has applications where flawless and redundant absolute rotary position data is critical. Robotic prosthetics (e.g., exoskeletons) for which its wearer is dependent on precise, repeatable, and reliable position measurements, or surgical robotics for which a surgeon and patient are dependent on flawless robotic operation, are examples of application areas.

The magnetic field sensing portion of the opto-magnetic architecture can be a single-axis, 2-axis, or 3-axis type sensor so the disclosed encoder can also be operated as a multi-axis sensor. For example, if the opto-magnetic architecture includes a 3-axis magnetic sensor, and the redundancy feature is not required, up to four separate axes can be measured.

A position encoder as disclosed may exhibit one or more of the following:
  Fully redundant absolute encoder in a small package
  In situ self-calibrating
  Self-compensating
  Self-monitoring
  Additional position axis sensitivity Additionally, the disclosed encoder may exhibit ease of installation due to employing misalignment compensation, as described more below. Taking advantage of the polarization sensor's immunity to misalignment, it provides ease of installation into a mechanical system even if that system has low precision benching features. The companion magnetic sensor will be sensitive to installation misalignment however, and its otherwise ideal Lissajous output will exhibit distortions indicative of misalignment or magnetic field interference.

Embodiments

FIG. 1 is a functional block diagram of an opto-magnetic rotary position sensor that employs an optical position sensor and a distinct and co-operating magnetic position sensor. In one embodiment the optical position sensor is a polarization-type rotational sensor employing a rotating polarizing element and associated source/sense optics and is thus referred to as the "polarization" sensor herein.

The polarization sensor includes polarizer source/sense components 10, a dual analog-to-digital converter (ADC) 12, and a polarization sensor digital control block 14. Correspondingly, the magnetic sensor includes magnetic source/sense components 16, a dual ADC 18, and a magnetic sensor digital control block 20. The digital control blocks 14, 20 contain various components including respective blocks 22, 24 shown as "GOP & ATAN2", which refers to (1) gain/offset/phase (GOP) compensation, and (2) arctangent (ATAN) calculation, using quadrature (sine, cosine) signals from the ADCs 12, 18. Other blocks and functionality of the digital control blocks 14, 20 are configuration and status 26, 28, compare and compensation 30, 32, and sensor correction 34, 36. The digital control blocks 14, 20 may be viewed as separate "channels" (CH) of position information, and thus their outputs are labelled Polarizer Ch Data and Magnetic Ch Data, respectively. These channel outputs are used by a higher-level controller that combines or "fuses" the sensor outputs to provide certain system-level functionality and benefits, as described herein.

For the proposed invention, the polarization and magnetic source/sensor pairs 10, 16 are aligned to each other and might, or might not, be measuring the same rotating axis. In the case where they are measuring the same rotating axis, the polarization encoder may preferably function as a "reference encoder" that reports accurate angle data even under misalignment conditions (due to inherent misalignment tolerance of polarization sensing). The magnetic encoder may report inaccurate angle measurement data if the sensor pair is misaligned during installation. Despite potentially inaccurate magnetic angle measurement, the measurement data is nonetheless repeatable and exhibits no hysteresis. By comparing the polarization and magnetic measurements via the two separate channels, the magnetic absolute measurement can be compensated to report accurate angle measurements.

Figure 2:
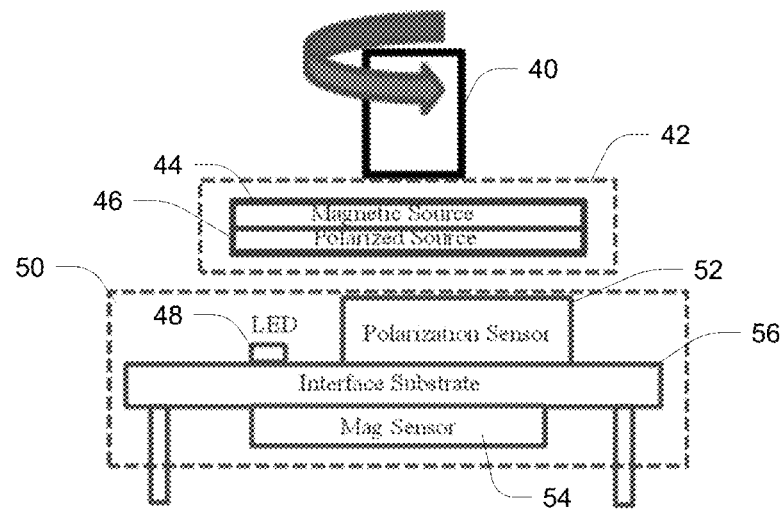

FIG. 2 is an illustration of a physical arrangement of the opto-magnetic sensor of FIG. 1 in one embodiment. The sensor is mounted in proximity to a rotating shaft 40 whose rotational position is to be sensed. First components 42 rotate with the shaft 40 and include a magnetic source 44 (e.g., dipole magnet) and a polarized "source" 46, which in this embodiment may be a rotating polarized mirror reflecting incident light generated by true light source such as light emitting diode (LED) 48. Sensing components 50 include a polarization sensor 52 and a magnetic sensor 54 mounted to an interface substrate 56, which is generally "stationary", i.e., does not rotate with the shaft 40 and establishes the reference against which rotation of the shaft 40 is measured). The polarization sensor 52 includes an optical detector that senses polarized light, and the magnetic sensor 54 includes a magnetic field detector. Because magnetic fields are unaffected by non-ferrous materials, the magnetic sensor system can measure the angle of the rotating magnet 44 even when the polarization source 36 and polarization sensor 52 are located between the magnetic source 44 and magnetic sensor 54 such as in this example. Since the polarization sensor is not impeded upon in this system architecture, both sensor types coexist in the same rotating axis while reporting accurate angle measurements.

In the example of FIG. 2 an interface substrate 56 is employed, with the polarization sensor 52 mounted on one side and the magnetic sensor 54 on the other. Alternative embodiments may dispense with the separate interface substrate 56, for example mounting the LED 48 and polarization sensor 52 directly onto a surface of a suitable magnetic sensor.

Figure 3:
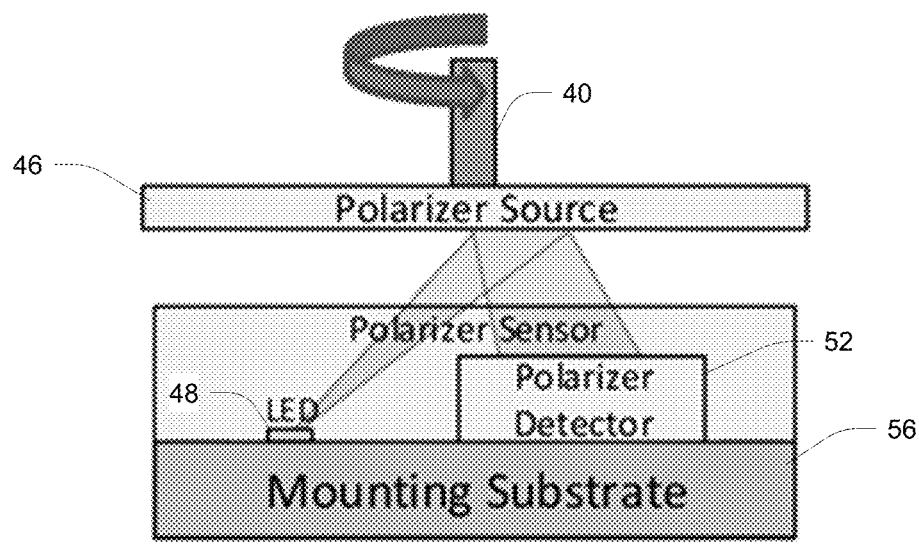

FIG. 3 illustrates a polarization-based optical absolute rotary encoder such as used in the embodiment of FIG. 2. It includes a light source (e.g., LED) 48, a rotating polarizer ("source") 46, and a polarization sensor 52 including an analyzing polarizer (or polarizer array) and a complementary detector (or detector array). The optical encoder system (i.e., source and detector) is highly tolerant of misalignment, and other environmental variables, which make it an excellent reference encoder for the opto-magnetic sensor.

The rotating polarization source 46 generates two sinusoidal cycles of variation per 360 degrees of rotation. In a typical use, some separate mechanism (not shown) is used to determine which of these two identical cycles is being observed, to achieve 360-degree absolute encoding. For example, the optical sensor can use a separate binary or "1-bit track" circuit to differentiate between the two polarization phases.

Figure 4:
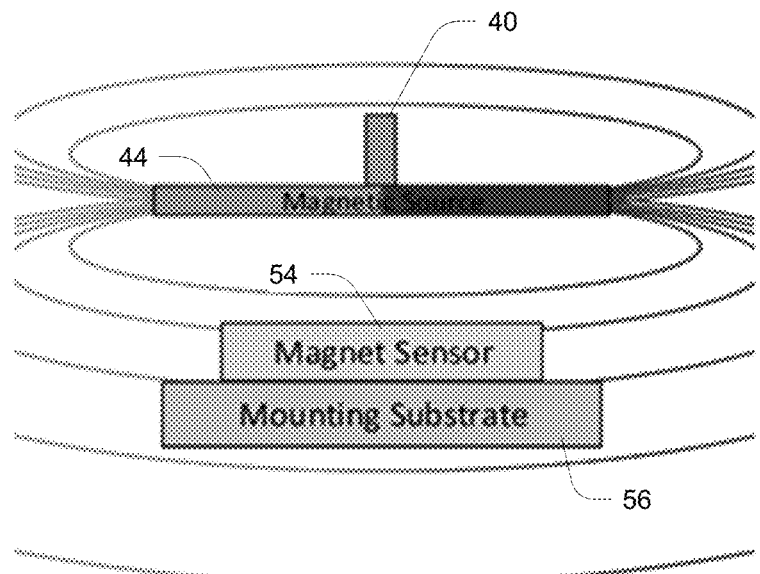

FIG. 4 shows magnetic sensor such as shown in FIG. 2. Magnetic rotary sensors are commercially available as a single-chip circuit (e.g., Hall effect sensor, tunnel magnetoresistance (TMR)) that senses the angle of a rotating magnet. The rotating magnet 44 is appropriately aligned and positioned on a rotating object 40 above the sensor 54. Unlike the optical polarization sensor system, the magnetic encoder is susceptible to position and tilt misalignment, but it also has good immunity to contaminants.

Figure 5:
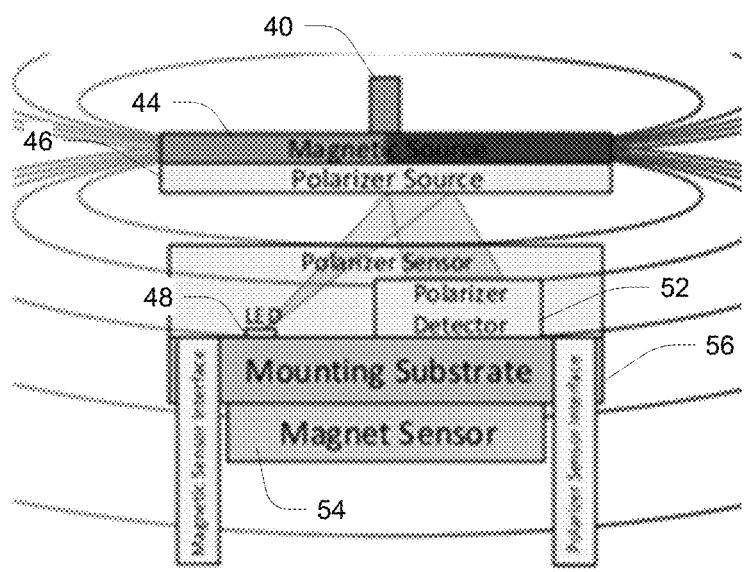

FIG. 5 is another depiction of an opto-magnetic sensor. Since the magnetic source-sensor pair can operate through non-ferrous materials with negligible effect on the sensor measurement, the opto-magnetic sensor components can be assembled to be in a small package, with both the polarization source-sensor and the magnetic source-sensor pair aligned to measure the same rotating axis. Because the polarization source-sensor pair is aligned with the magnetic source-sensor pair, the magnetic sensor data can be used instead of a separate 1-bit track to distinguish between the polarization encoder's two sinusoidal cycles.

Redundancy

The polarization sensor and magnetic sensor are sensitive only to their respective rotating sources (ignoring environmental interference), so data from each sensor is output independently on its own signal bus (or "channel," as described above). If both sensor types have independent power and ground, the system may be a fully redundant absolute encoder. Alternatively, other types or levels of redundancy may be achieved, including:

- A system that shares power and ground can still be considered to transmit redundant absolute data.
- Other possible interface structures might include a single, or two separate interfaces, with data from both sensor types multiplexed into one data path.
- Other combinations or multiplexed data paths and single data paths might be considered.

The proposed opto-magnetic sensor structure can use the magnetic sensor data to distinguish between the two cycles of the polarization source. If the magnetic sensor fails during normal operation, then the phase of the polarization source is lost. To assure a fault tolerant redundant sensor, an implementation may also include a counter circuit on the polarization sensor that is reset relative to the phase of the magnetic sensor so that, in the event of a magnetic sensor failure, the polarization sensor position (and the specific polarization encoder's sinusoidal cycle) can be absolutely determined.

Magnetic Sensor Tilt Compensation

Figure 6:
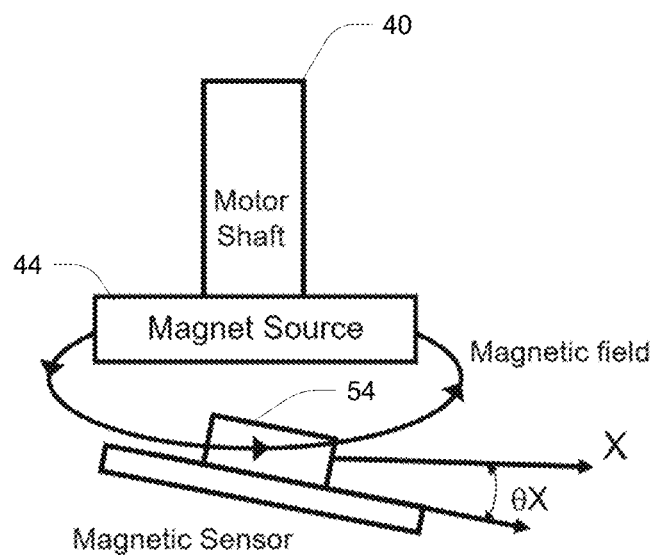
Figure 7:
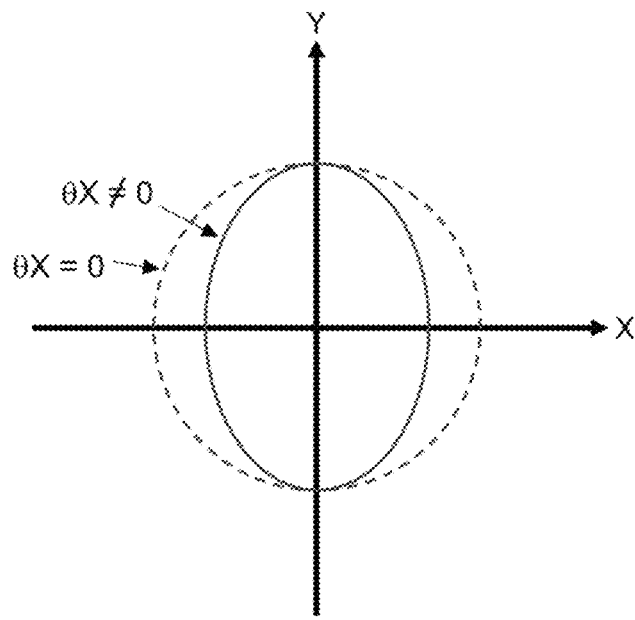

FIGS. 6 and 7 illustrate an ability for the opto-magnetic sensor to compensate for non-zero relative inclination of the magnetic sensor. In this case, an angular error occurs due to a non-zero mounting inclination ("inclination angle") of the Hall element sensor 54. As shown in FIG. 7, the Lissajous figure becomes an ellipse because the magnetic field input from the inclined direction becomes weak. For example, when the Hall element 54 is tilted with respect to the X-axis direction, the magnetic field input to the Hall element 54 becomes weaker when the rotation angle θ is 0° and 180°, whereas at 90° and 270° the magnetic field strength is not affected by the tilt.

Because the polarization sensor is virtually immune to misalignment, its sensor data can be used as a "perfect reference" to detect misalignment. This relationship can be used to either compensate for the magnetic sensor error or provide feedback of magnetic sensor misalignment.

Magnetic Sensor Misalignment (or Stray Field) Compensation

Figure 8:
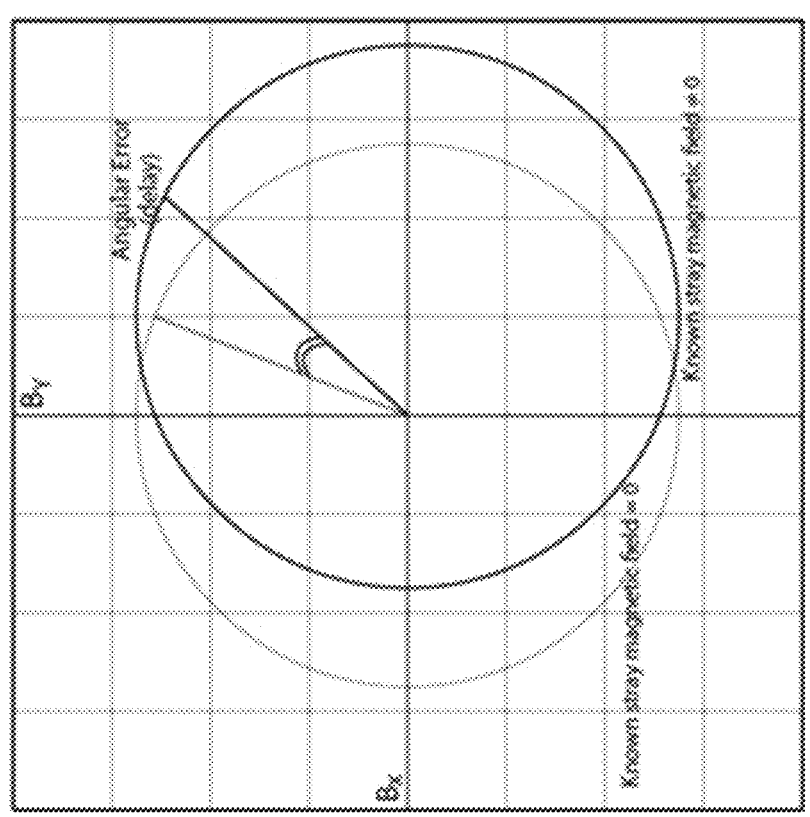

FIG. 8 illustrates anther case of detecting or compensating for angular error that occurs due to the influence of magnetic sensor misalignment or a stray magnetic field input from the horizontal direction of the permanent magnet. For example, if a stray magnetic field is input in the X-axis direction, the center of the Lissajous figure is offset in the X-axis direction as shown. Because the optical sensor is virtually immune to misalignment and stray magnetic fields, its sensor data can be used as a "perfect reference" to detect magnetic sensor/source misalignment. This relationship can be used to either compensate for the magnetic sensor error or provide feedback for magnetic sensor alignment.

In another aspect, because the polarization sensor is measuring the same rotating axis as the magnetic sensor, the polarization sensor's ideal angular measurement (i.e., Lissajous) can be referenced to calibrate and compensate for the magnetic sensor distortion using an installation procedure. The Lissajous is the XY amplitude value change as the encoder rotates. The arctan of those XY values is the angle. Because the magnetic channel angle measurement exhibits no hysteresis, each measured angle is unique and can be compensated using a look up table or through a compensation algorithm.

Calibration

Figure 9:
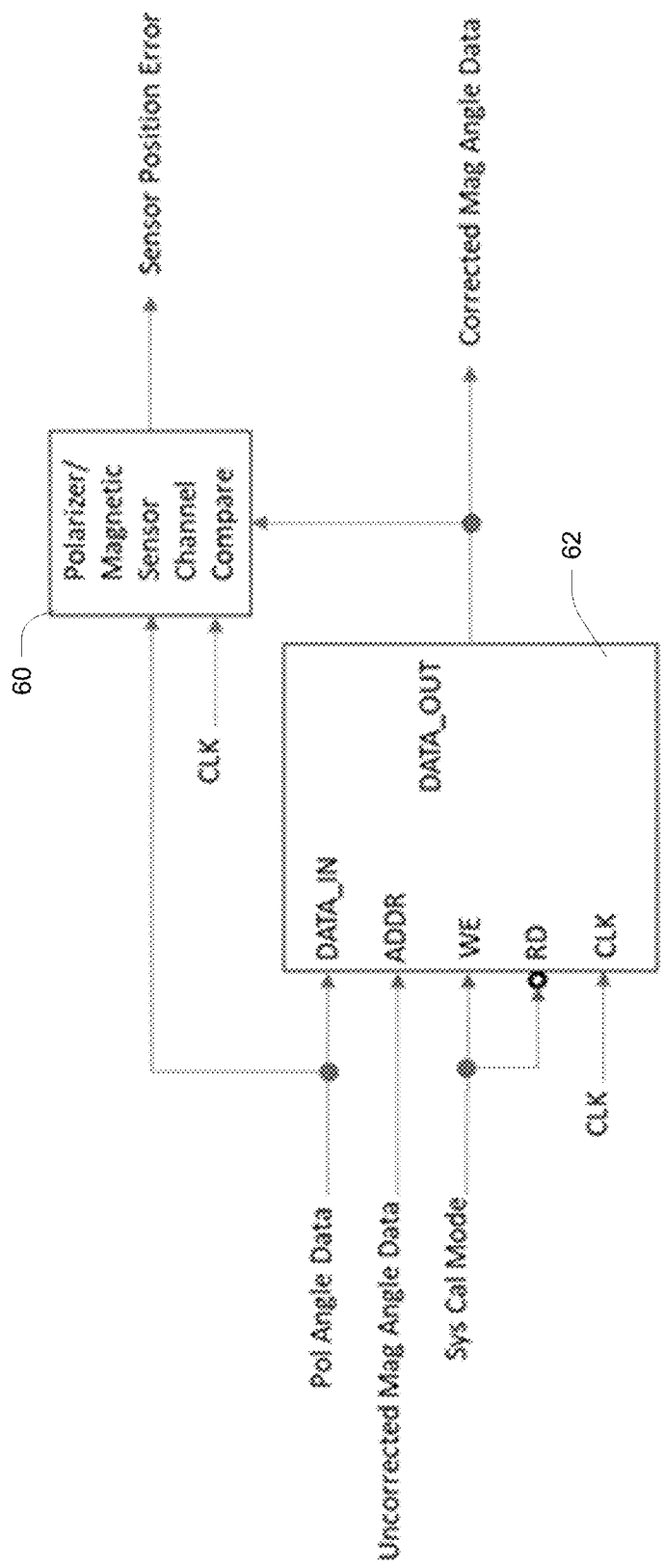

FIG. 9 is a block diagram of a magnetic sensor channel compensation unit. It employs a comparison block 60 for determining magnetic channel error, and a memory structure 62 used as a look up table (LUT). During a system calibration mode of operation, polarization angle data input is stored into a memory location that is addressed by the uncorrected magnetic angle data input. During normal operation, the uncorrected magnetic angle value represents an address to the LUT 62 which then outputs the reference angle data that was stored during calibration mode.

Self-Monitoring

Figure 10:
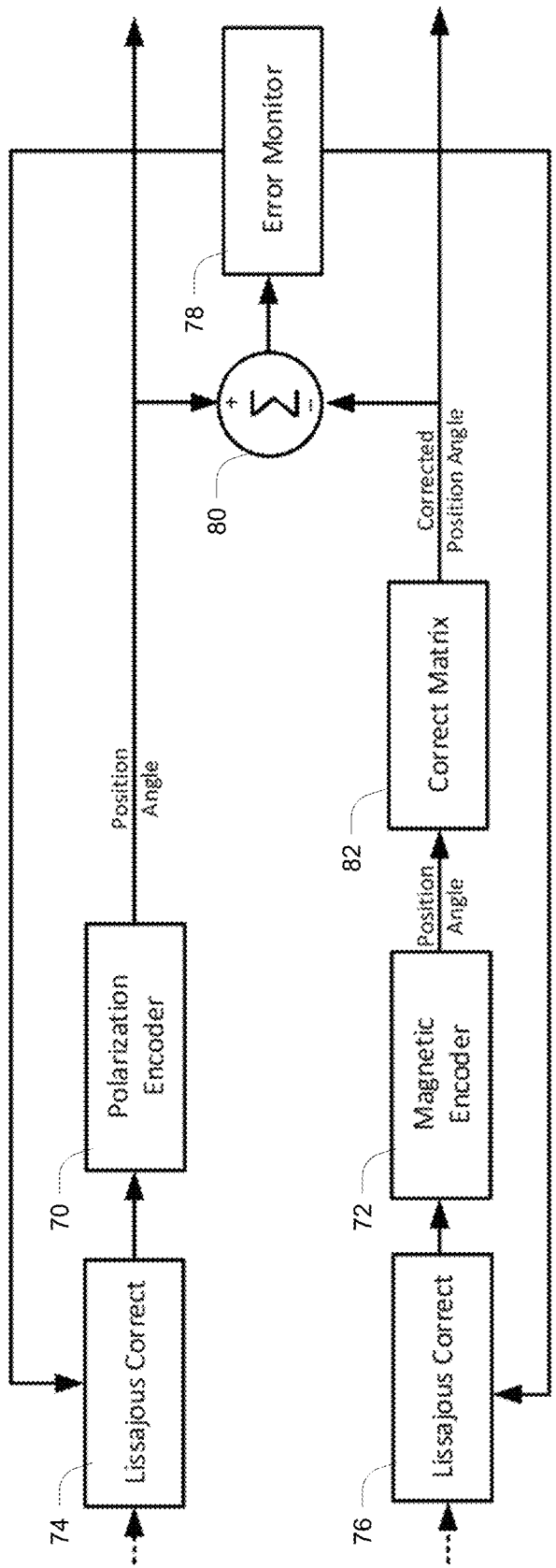

FIG. 10 illustrates another potential arrangement, which can be enabled because optical sensor components and magnetic sensor components are generally susceptible to different environmental factors. For example, the optical sensor can be susceptible to contaminants but not to magnetic interference, while the magnetic sensor can be susceptible to magnetic interference and misalignment but can be more tolerant of contaminants. Because each sensor type exhibits different susceptibilities, each sensor type can monitor the integrity of the other sensor type.

FIG. 10 illustrates self-monitoring circuitry that may be employed. Optical and magnetic channels have respective polarization and magnetic encoders 70, 72 and employ respective Lissajous correction blocks 74, 76. These receive inputs from an error monitor 68 which is fed by the output from a comparator 80 that compares the optical channel and magnetic channel outputs. The magnetic channel also employs a correction matrix 82 as shown.

When the system is behaving properly, the uncorrected magnetic angle data result is corrected by the correction matrix 82 to generate a corrected value that matches the polarization angle data value. If the uncorrected values change due environmental influences, misalignment, etc., the corrected magnetic angle data and the polarizer angle data no longer match. Various algorithms can be used to determine the nature of this mismatch. As an example, during runtime the error monitor 78 can decide if either the optical or the magnetic sensor Lissajous roundness needs to be corrected based on the size, polarity and nature of the error and other operational parameters of each encoder.

Thus, the self-monitoring can, for example, correct for the effect of debris that may reduce the output accuracy of the polarization encoder by monitoring the magnetic sensor which is not sensitive to the debris. Conversely, the output of the magnetic sensor can be corrected when there is an interfering magnetic field or ferrous debris, based on the unaffected polarization sensor.

Monitor Magnetic Interference

In normal operation, after the magnetic sensor system is calibrated, any variation of the magnetic sensor's angle measurement can be compared to the polarization sensor measurement to assist detection and characterization of the variation.

Monitor Contamination

In normal operation, after the magnetic sensor system is calibrated, any variation of the polarization sensor's angle measurement can be compared to the magnetic sensor's measurement to assist detection and characterization of the variation due to contaminants. At the same time, in the gain-offset-phase (GOP) block, the polarization channel amplitude can be stored during calibration and can be used as a reference during normal operation to determine if the input channel amplitude has changed.

Monitor Other System Characteristics

The opto-magnetic architecture is aligned and calibrated during installation. As a system ages, variations in the magnetic sensor data can be monitored for real-time detection of changes in the system's behavior.

Monitor system wear (e.g., misalignment)

Detect non-repeatable runout, indicating bearing wear

On Axis or Off Axis Installation with a Single Sensor Type

Figure 11:
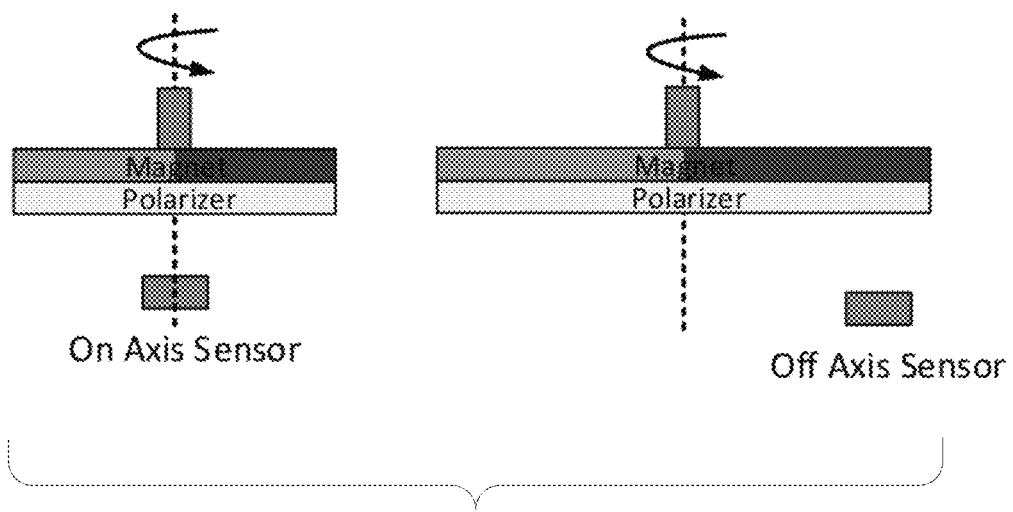

FIG. 11 illustrates that the opto-magnetic sensor may be employed in two basic arrangements, namely "on-axis" and "off-axis", which refers to whether the sensor(s) is/are aligned to the axis of rotation being sensed. The arrangements of FIGS. 2-6 are all on-axis, and a generalized on-axis arrangement is shown at left in FIG. 11. On the right is shown a generalized off-axis arrangement, with the sensor(s) located away from the axis of rotation.

An opto-magnetic sensor as described herein may be able to sense and measure source energy of a "donut shaped" opto-magnetic source.

Prosthetics: Polarization Sensor for Joint Control, Magnetic Sensor for Error Feedback (i.e., for Sensory Feedback).

The sensor may be used in a prosthetic ankle example, where it is desired to provide feedback of tilt or position anomalies such as occur when the wearer steps on a stone or some other obstacle. The opto-magnetic sensor data outputs can be processed to identify such tilt or position anomalies.

While various embodiments of the invention have been particularly shown and described, it will be understood by

What is claimed is:

1. An opto-magnetic rotary position encoder for sensing rotational position of a rotating component, comprising:
   a polarization-based optical encoder configured for on-axis placement and operation with respect to a rotational axis of the rotating component, including (1) a polarizer configured for mounting for rotation with the rotating component, and (2) polarization source/sensing components configured for mounting in proximity to the polarizer to provide a source light beam to the polarizer and to detect a polarized return light beam therefrom;
   a magnetic encoder configured for on-axis placement and operation with respect to the rotational axis of the rotating component, including (1) a magnet configured for mounting for rotation with the rotating component, and (2) magnetic sensing components configured for mounting in proximity to the magnet to detect a magnetic field from the magnet; and
   control circuitry configured and operative to generate polarizer channel position data from the detected polarized return light beam and magnetic channel position data from the detected magnetic field,
   and further including a magnetic sensor channel compensation unit having a comparison block for determining magnetic channel error, and a memory structure used as a lookup table, and wherein the control circuitry is configured and operative, during a system calibration mode of operation, to store polarization angle data into the lookup table at locations addressed by uncorrected magnetic angle data, and during normal operation to use the uncorrected magnetic angle data as an address to the lookup table which produces reference angle data that was stored during calibration mode.

2. The opto-magnetic position encoder of claim 1, wherein the control circuitry includes (1) a polarization sensor digital control block in the polarization-based optical encoder, configured and operative to generate the polarizer channel position data from the detected polarized return light beam, and (2) a magnetic sensor digital control block in the magnetic encoder configured and operative to generate the magnetic channel position data from the detected magnetic field.

3. The opto-magnetic position encoder of claim 2, wherein the polarization sensor digital control block and magnetic sensor digital control block being further co-configured and co-operative to combine the polarizer channel position data and the magnetic channel position data in a manner providing for one or more of (1) redundancy, (2) calibration, (3) performance monitoring, or (4) compensation or correction.

4. The opto-magnetic rotary position encoder according to claim 3, wherein each of the sensor digital control blocks includes a respective compare and compensation block and a respective sensor correction block, the compare and compensation block receiving uncorrected angle data from the sensor digital control block and generating a correction control output, the sensor correction block applying correction to the uncorrected angle data based on the correction control output to produce the channel position data.

5. The opto-magnetic rotary position encoder of claim 1, being a redundant encoder in which the polarizer channel position data and the magnetic channel position data are output from the respective encoders independently on respective distinct signal buses.

6. The opto-magnetic rotary position encoder of claim 5, wherein the polarization-based optical encoder and the magnetic encoder have respective independent power supplies for a fully redundant absolute encoder.

7. The opto-magnetic rotary position encoder of claim 1, further including a higher-level controller configured and operative to combine the polarizer channel position data and the magnetic channel position data to produce system-level position data indicating rotational position of the rotating component.

8. The opto-magnetic rotary position encoder of claim 1, wherein the polarization-based optical encoder functions as a reference encoder reporting accurate angle data under misalignment conditions, the misalignment conditions causing the magnetic encoder to produce inaccurate uncorrected position data, and wherein polarization and magnetic measurements are compared to compensate for the inaccurate uncorrected position data and produce accurate angle measurement data.

9. The opto-magnetic rotary position encoder of claim 1, wherein the magnetic channel position data are used to distinguish between two electrical cycles of the polarized return light beam for each mechanical cycle of rotation of the polarizer.

10. The opto-magnetic rotary position encoder of claim 1, wherein the polarization channel position data is used to compensate for non-zero relative inclination of the magnetic source/sensing components.

11. The opto-magnetic rotary position encoder of claim 1, wherein the polarization channel position data is used to compensate for an effect of a stray magnetic field on operation of the magnetic source/sensing components.

12. The opto-magnetic rotary position encoder of claim 1, wherein the control circuitry implements self-monitoring circuitry having (1) respective Lissajous correction blocks for the polarization-based optical encoder and the magnetic encoder, (2) a correction matrix, and (3) an error monitor receiving an output from a comparator that compares the polarizer channel position data and magnetic channel position data, and wherein uncorrected magnetic angle data is corrected by the correction matrix to generate a corrected value that matches the polarization angle data value.

13. The opto-magnetic rotary position encoder of claim 12, wherein during runtime the error monitor determines an error condition in which one of the optical sensor or the magnetic sensor Lissajous roundness is incorrect.

14. The opto-magnetic rotary position sensor of claim 13, wherein the error condition is corrected based on size or polarity of an error.

15. The opto-magnetic rotary position encoder of claim 1, wherein the polarization source/sensing components and the magnetic sensing components are mounted to an interface substrate, the polarization source/sensing components being mounted to a first side of the interface substrate facing the polarizer and receiving the polarized return light beam, the magnetic sensor components being mounted to a second side of the interface substrate facing away from the polarizer.

16. An opto-magnetic rotary position encoder for sensing rotational position of a rotating component, comprising:
   a polarization-based optical encoder configured for on-axis placement and operation with respect to a rotational axis of the rotating component, including (1) a polarizer configured for mounting for rotation with the rotating component, and (2) polarization source/sensing components configured for mounting in proximity to the polarizer to provide a source light beam to the polarizer and to detect a polarized return light beam therefrom;

a magnetic encoder configured for on-axis placement and operation with respect to the rotational axis of the rotating component, including (1) a magnet configured for mounting for rotation with the rotating component, and (2) magnetic sensing components configured for mounting in proximity to the magnet to detect a magnetic field from the magnet; and control circuitry configured and operative to generate polarizer channel position data from the detected polarized return light beam and magnetic channel position data from the detected magnetic field, wherein the control circuitry implements self-monitoring circuitry having (1) respective Lissajous correction blocks for the polarization-based optical encoder and the magnetic encoder, (2) a correction matrix, and (3) an error monitor receiving an output from a comparator that compares the polarizer channel position data and magnetic channel position data, and wherein uncorrected magnetic angle data is corrected by the correction matrix to generate a corrected value that matches the polarization angle data value.

17. The opto-magnetic rotary position encoder of claim 16, wherein during runtime the error monitor determines an error condition in which one of the optical sensor or the magnetic sensor Lissajous roundness is incorrect.

18. The opto-magnetic rotary position sensor of claim 17, wherein the error condition is corrected based on size or polarity of an error.

19. An opto-magnetic rotary position encoder for sensing rotational position of a rotating component, comprising:

a polarization-based optical encoder configured for on-axis placement and operation with respect to a rotational axis of the rotating component, including (1) a polarizer configured for mounting for rotation with the rotating component, and (2) polarization source/sensing components configured for mounting in proximity to the polarizer to provide a source light beam to the polarizer and to detect a polarized return light beam therefrom;

a magnetic encoder configured for on-axis placement and operation with respect to the rotational axis of the rotating component, including (1) a magnet configured for mounting for rotation with the rotating component, and (2) magnetic sensing components configured for mounting in proximity to the magnet to detect a magnetic field from the magnet; and control circuitry configured and operative to generate polarizer channel position data from the detected polarized return light beam and magnetic channel position data from the detected magnetic field, wherein the polarization source/sensing components and the magnetic sensing components are mounted to an interface substrate, the polarization source/sensing components being mounted to a first side of the interface substrate facing the polarizer and receiving the polarized return light beam, the magnetic sensor components being mounted to a second side of the interface substrate facing away from the polarizer.

* * * * *